United States Patent [19]
Yamamori et al.

[11] 4,223,566
[45] Sep. 23, 1980

[54] TRANSVERSE AUTOMATIC POWER TRANSMISSION WITH IMPROVED BEARING CONSTRUCTION FOR OUTPUT GEAR ELEMENTS

[75] Inventors: Takahiro Yamamori, Tokyo; Kazuyoshi Iwanaga; Kunio Ohtsuka, both of Yokohama, all of Japan

[73] Assignee: Nissan Motor Company, Limited, Yokohama, Japan

[21] Appl. No.: 947,220

[22] Filed: Sep. 29, 1978

[30] Foreign Application Priority Data

Sep. 18, 1978 [JP] Japan .................. 53-114941

[51] Int. Cl.$^2$ .................. F16H 57/02; F16H 37/08
[52] U.S. Cl. .................. 74/606 R; 74/695
[58] Field of Search .................. 74/606 R, 695

[56] References Cited

U.S. PATENT DOCUMENTS

| | | | |
|---|---|---|---|
| 2,808,738 | 10/1957 | Bartell | 74/695 X |
| 3,095,758 | 7/1963 | Bixby | 74/695 X |
| 3,491,621 | 1/1970 | Moan | 74/695 X |
| 3,614,902 | 10/1971 | Candellero | 74/695 |
| 3,703,107 | 11/1972 | Piret | 74/695 |
| 3,793,906 | 2/1974 | Williams et al. | 74/695 X |
| 3,800,626 | 4/1974 | Koivunen | 74/695 |
| 3,802,289 | 4/1974 | Cheek | 74/606 X |
| 4,056,988 | 11/1977 | Kubo et al. | 74/695 |

FOREIGN PATENT DOCUMENTS 2722891 12/1977 Fed. Rep. of Germany ............ 74/695
1100334 1/1968 United Kingdom ..................... 74/695

Primary Examiner—Leslie Braun
Attorney, Agent, or Firm—Thompson, Birch, Gauthier & Samuels

[57] ABSTRACT

First and second bearings are arranged on either side of an output gear of the transmission to bear the same, and third and fourth bearings are arranged to bear an idler gear which meshes with the output gear to transmit the revolution of the output gear to a final drive assembly mounted on a side of the transmission. The first bearing is supported by part of a converter housing, the second bearing is supported by a separate member disposed within and detachably connected to the converter housing, and the third and fourth bearings are supported on a support which extends between the housing and the separate member.

16 Claims, 6 Drawing Figures

TRANSVERSE AUTOMATIC POWER TRANSMISSION WITH IMPROVED BEARING CONSTRUCTION FOR OUTPUT GEAR ELEMENTS

FIELD OF THE INVENTION

The present invention relates in general to an automotive automatic power transmission which is designed and constructed to be transversely mounted on an F-F type motor vehicle in which an engine such as internal combustion engine is mounted at the front of the vehicle with drive to the front wheels. More particularly, the present invention is concerned with a bearing construction for bearing output and idler gears of the transmission by which a drive connection is established with a final drive unit which is mounted beside the transmission.

BACKGROUND OF THE INVENTION

In the transversely mounted type automatic transmission mentioned above, it is usually observed that an output gear and an idler gear meshing with the output gear are positioned substantially between a torque converter and a gear unit of the transmission. Hitherto, however, it has been difficult to develop a low cost but efficient and long lasting bearing construction that can be mounted to the transmission for the purpose of bearing such output and idler gears.

SUMMARY OF THE INVENTION

Therefore, an essential object of the present invention is to provide an improved and new bearing construction which possesses the above features which conventional bearing constructions fail to have.

According to the present invention there is provided a power transmission including a torque converter housed in a converter housing, a planetary gear system that includes planetary gear elements, a power input shaft of the planetary gear system being connected to a driven member of the torque converter, a power output shaft of the planetary gear system having an output gear at a position between the torque converter and the planetary gear elements, first and second bearing members arranged to put therebetween the output gear to bear the same, an idler gear meshing with the output gear for transmitting the revolution of the output gear to a final drive unit, third and fourth bearing members for bearing the idler gear, and a second housing enclosing the planetary gear system, he power transmission comprising: a first support member integral with the converter housing, the first support member being located between the planetary gear elements and the output gear and having an opening in which the first bearing member is disposed for rotatably supporting in part the output gear relative to the first support member; a second support member detachably connected to the converter housing and having a bore in which the second bearing member is disposed for rotatably supporting in part the output gear relative to the second support member; and a third support member spanned between the first and second support members for mounting thereon the third and fourth bearing members on which the idler gear is rotatably mounted.

SUMMARY OF THE DRAWINGS

Other objects and advantages of the present invention will become clear from the following description when taken in conjunction with the accompanying drawings, in which.

Prior to describing the construction of the invention in detail, a brief explanation of the two conventional units of the transmission and the final drive unit will be made with reference to FIGS. 1 and 2 in order to clarify the invention.

Figure 1:
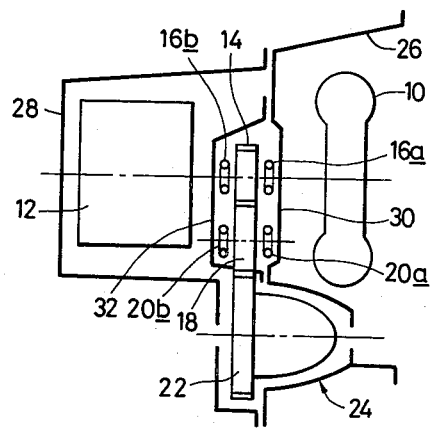
FIGS. 1 and 2 are sketches of two conventionally used transversely mounted type automatic power transmissions each being combined with a final drive unit including a differential gear assembly, depicting the positional relationship of a torque converter, a gear unit of the transmission and the final drive unit
Figure 2:
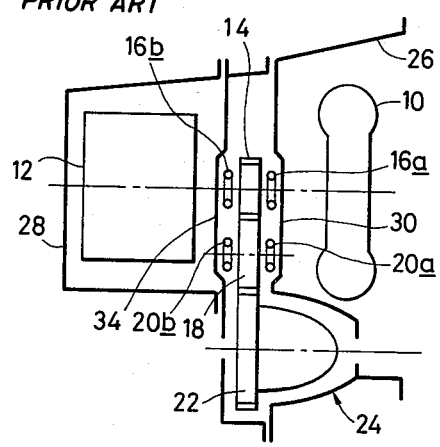

In FIGS. 1 and 2 of the drawings, there are respectively and schematically shown the prior art units of the transmission and the final drive unit, each generally comprising a torque converter 10, a power transmission mechanism or gear unit 12, an output gear 14 on an output shaft (not shown), a first pair of bearings 16a and 16b for the output gear 14, an idler gear 18 meshing with the output gear 14, a second pair of bearings 20a and 20b for the idler gear 18, a ring gear 22 of a differential gear assembly 24 meshing with the idler gear 18, a converter housing 26 of the torque converter assembly 10 and a gear unit housing 28 for the gear unit 12.

In the unit of FIG. 1, the bearings 16a and 20a near the converter 10 are supported by a supporting portion 30 which is integral with the converter housing 26, while the bearings 16b and 20b near the gear unit 12 are supported by a separate cover member 32 which is detachably connected to the converter housing 26 to cover the output gear 14 and the idler gear 18.

In the unit of FIG. 2, the bearings 16a and 20a are supported by a supporting portion 30 integral with the converter housing 26 similarly to that of FIG. 1, while the bearings 16a and 20b near the gear unit 12 are supported by an intermediate casing member 34 which is interposed between the converter housing 26 and the gear unit housing 28, as shown.

These units mentioned above however suffer from several disadvantages. For example, in FIG. 1, it is difficult to provide the cover member 32 with sufficient mechanical strength because the member 32 is complicatedly bent to define a recess. The unit of FIG. 2, while in part solving the problems encountered in FIG. 1, suffers from the drawbacks that the addition of the intermediate casing member 34 to the transmission unit will not only complicate and lengthen the production and assembly operations, but will also cause the transmission unit to be heavier and bulkier.

Figure 3:
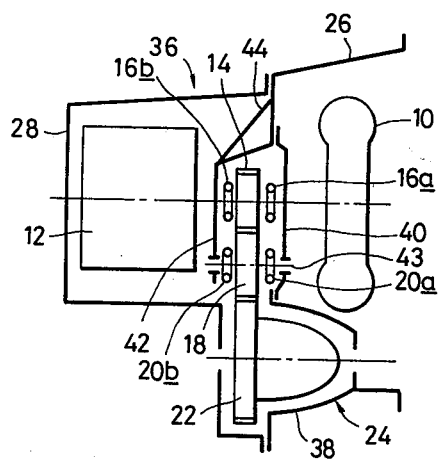
FIG. 3 is a sketch similar to those of FIGS. 1 and 2, but shows the present invention.

Referring to FIG. 3, there is schematically shown a unit of a transversley mounted type automatic power transmission 36 and a final drive unit 24, to which the present invention is applied. This drawing is presented for clear understanding of the concept of the present invention which differs from those of FIGS. 1 and 2.

Figure 4A:
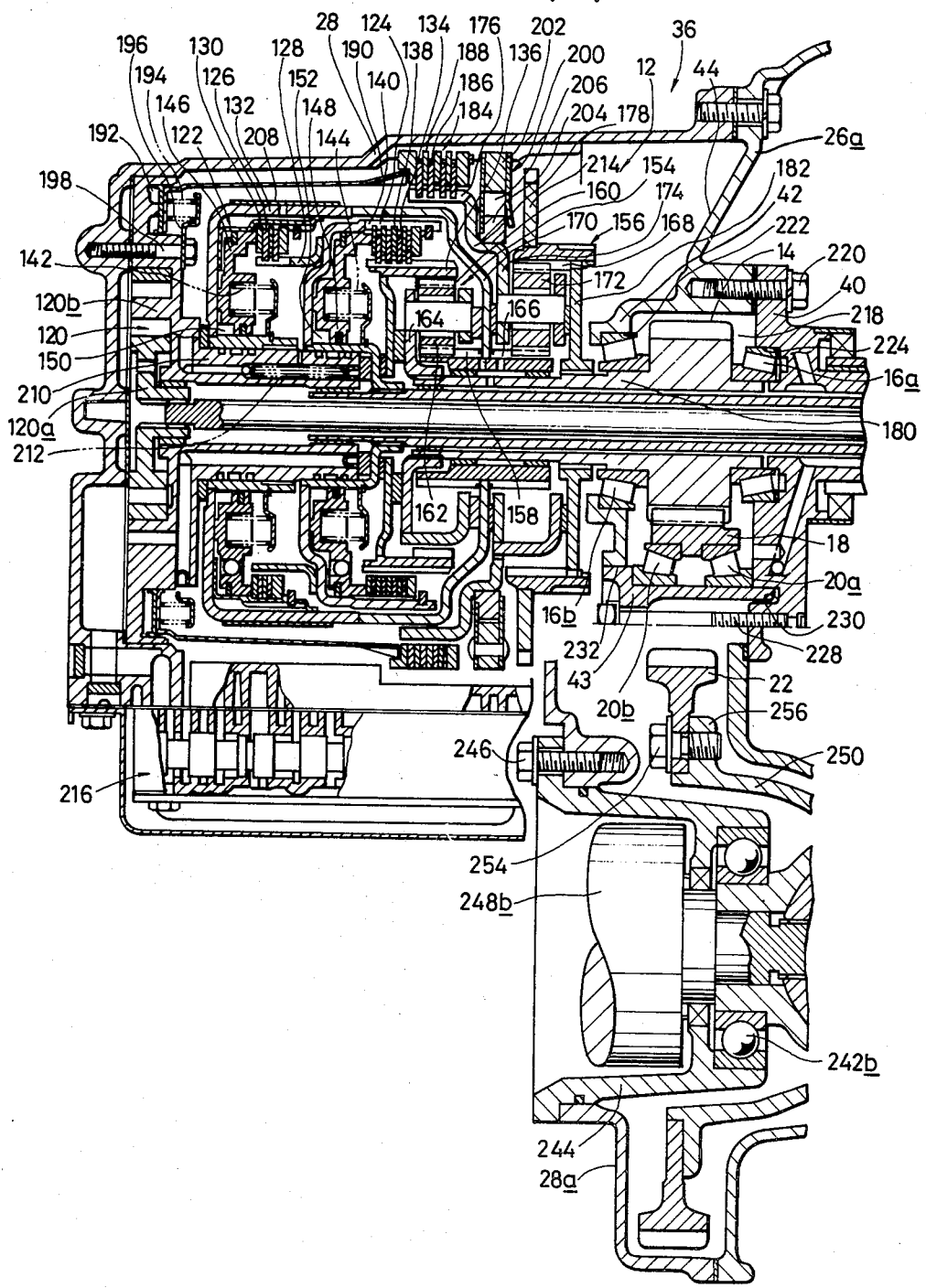
FIG. 4 consisting of FIGS. 4(A) and 4(B) is a detailed sectional view of a unit comprising a transversely mounted type automatic power transmission and a final drive unit, to which the present invention is applied, a portion constituting the final drive unit being shown appropriately sectioned for clarity.
Figure 4B:
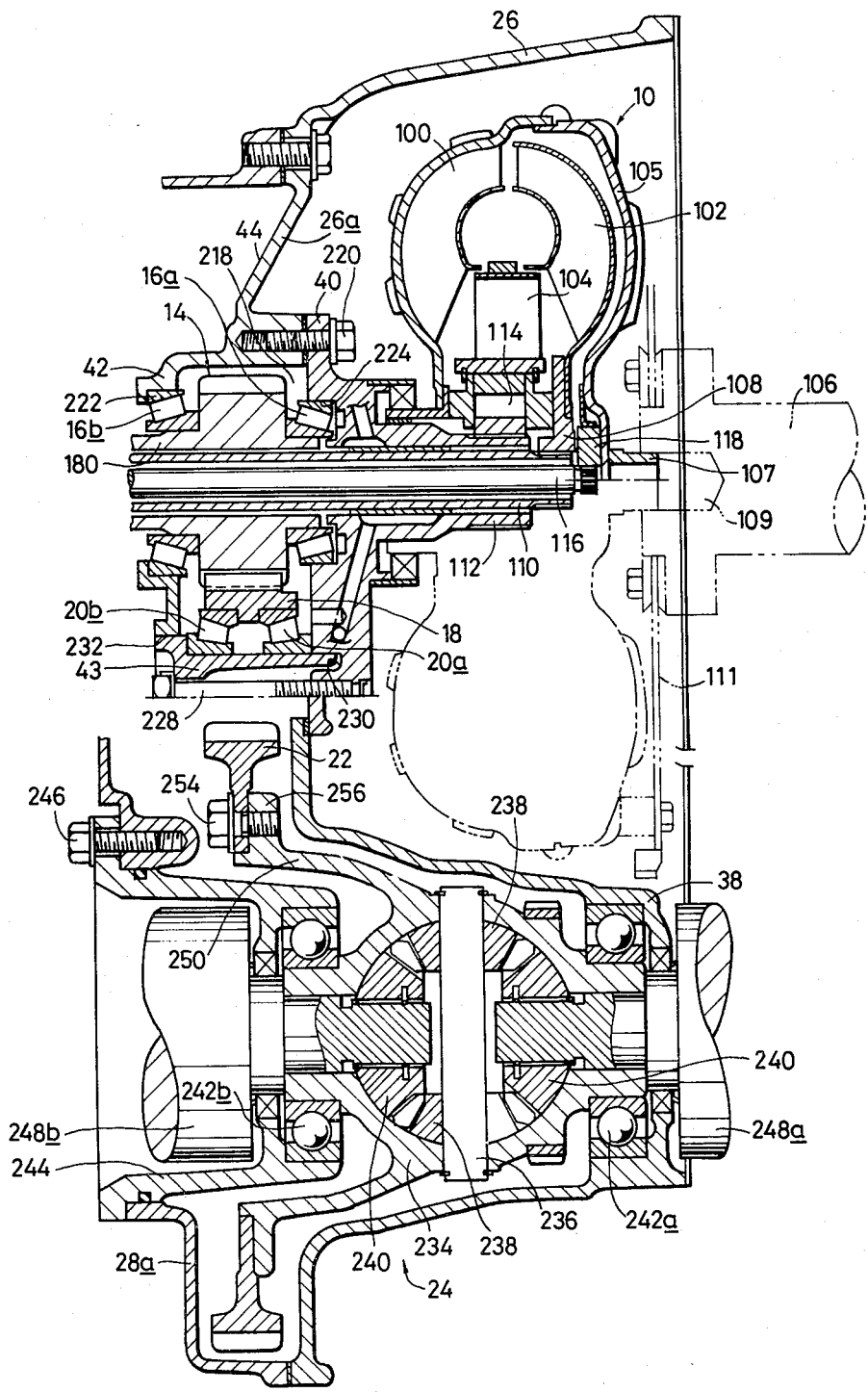

(Detailed explanation of the unit in construction will be made hereinlater with reference to FIG. 4.)

As is noted from FIG. 3, the unit to which the present invention is applied has a construction somewhat similar to those of FIGS. 1 and 2. Thus, corresponding similar parts will be indicated by like numerals of reference for facilitation of the drawing and description. In the invention, the bearing 16a for the output gear 14 is supported by a cover member 40 which is detachably connected to the converter housing 26, while the bearing 16b positioned near the gear unit 12 is supported by a supporting portion 42 which is integral with the converter housing 26 and projects toward the gear unit 12, as shown. The bearings 20a and 20b (fourth and third) for the idler gear 18 are mounted on a support member 43 which is spanned between the cover member 40 and the supporting portion 42 of the converter housing 26. Designated by numeral 44 are ribs which are integrally formed on the supporting portion 42 for the purpose of increasing the mechanical strength of the same.

The following description is directed to the detail of the unit of the transmission 36 and the final drive unit 24, which will be made with reference to FIG. 4.

The transmission 36 comprises the converter housing 26 within which the torque converter assembly 10 is housed. The torque converter assembly 10 comprises a pump impeller 100, a turbine runner 102, and a stator 104 as is well known in the art. The pump impeller 100 is connected via a converter cover 105 and a drive plate 111 to a crankshaft 106 of a power plant such as an internal combustion engine (not shown) and is rotatable with the crankshaft 106 about an axis which is aligned with the axis of rotation of the crankshaft 106. Denoted by 107 is a pilot element which is secured to a central portion of the converter cover 105 and is received in a central bore 109 of the crankshaft 106, as shown. The turbine runner 102 is mounted on a hub 108 which in turn is keyed or splined to a transmission hollow input shaft 110 which has a center axis aligned with the axis of rotation of the engine crankshaft 106. The stator 104 is positioned between the pump impeller 100 and the turbine runner 102 and is mounted on a stator support hollow shaft 112 through a torque converter one-way clutch assembly 114. The stator support hollow shaft 112 has the transmission hollow input shaft 110 axially passed therethrough in a substantially coaxial relationship and is fixedly but detachably connected through a flange portion (or the cover member) 40 formed thereon to a base wall 26a of the converter housing 26, as will be well understood hereinlater. The stator 104 is permitted to rotate about the center axis of the input shaft 110 in the same direction as the direction of the pump impeller 100 and accordingly as the direction of rotation of the engine crankshaft 106. An oil pump driving shaft 116 is rotatably and concentrically received in the input shaft 110 and has a right end to which a hub 118 of the converter cover 105 is splined or keyed. As will be well understood hereinlater, a left end of the oil pump driving shaft 116 is keyed with a drive gear 120a of a transmission oil pump assembly 120 which has an oil pump body 120b bolted or otherwise secured to a stationary wall structure of the gear unit housing 28 of the transmission 36.

When the engine is in operation, the driving power produced by the engine is delivered from the engine crankshaft 106 to the pump impeller 100 through the converter cover 105 and is transmitted from the pump impeller 100 to the transmission hollow input shaft 110 through the turbine runner 102 with a torque multiplied by means of the stator 104 at a ratio which is variable with the ratio between the revolution speed of the engine crankshaft 106 and that of the input shaft 110. The pump impeller 100 drives not only the turbine runner 102 but also the transmission oil pump assembly 120 through the oil pump driving shaft 116 so that the oil pump assembly 120 delivers oil under pressure which is also variable with the revolution speed of the crankshaft 106 of the engine.

On the left side of the torque converter assembly 10, in this drawing, is positioned the gear unit 12 of the transmission 36. The unity 12 herein shown is arranged between the torque converter assembly 10 and the oil pump assembly 120 and is housed in the gear unit housing 28. The gear unit 12 comprises first and second or high-and-reverse and forward drive clutches 122 and 124 which are positioned in a manner that the high-and-reverse clutch 122 is located between the oil pump assembly 120 and the forward drive clutch 124. The high-and-reverse clutch 122 comprises a plurality of plates 126 keyed or splined at their inner peripheral edges to a clutch hub 128 and plates 130 keyed or splined at their outer peripheral edges to a first clutch drum 132 which is in part positioned between the clutches 122 and 124 as shown. Likewise, the forward drive clutch 124 comprises a plurality of plates 134 keyed or splined at their inner peripheral edges to a clutch hub 136 and plates 138 keyed or splined at their outer peripheral edges to a second clutch drum 140. The clutch hub 128 for the high-and-reverse clutch 122 and the second clutch drum 140 for the forward drive clutch 124 are secured to each other and rotatable with the output shaft 110 with the second clutch drum 140 keyed or splined at its inner peripheral portion to a left end portion of the transmission hollow input shaft 110. The plate 126 of the high-and-reverse clutch 122 and the plates 138 of the forward drive clutch 124 thus serve as driving friction elements and, accordingly, the plates 130 of the high-and-reverse clutch 122 and the plates 134 of the forward drive clutch 124 serve as driven friction elements in the clutches 122 and 124, respectively. Return springs 142 and 144 are respectively incorporated with the high-and-reverse clutch 122 and the forward drive clutch 124 to urge the clutches 122 and 124 to be disengaged, respectively. Clutch pistons 146 and 148 are respectively incorporated with the high-and-reverse clutch 122 and the forward drive clutch 124 respectively for bringing the clutches 122 and 124 into engagement when moved by a fluid fed into respective fluid chambers 150 and 152 which are formed between the clutch piston 146 and the first clutch drum 132 and between the clutch piston 148 and the second clutch drum 140, respectively, as shown.

The unit 12 further comprises first and second planetary gear assemblies 154 and 156 which are arranged at the right of the forward drive clutch 124. The first planetary gear assembly 154 comprises an externally toothed sun gear 158 and an internally toothed ring gear 160 which have a common axis of rotation aligned with the center axis of the input shaft 110. The ring gear 160 is formed on the clutch hub 136 for the forward drive clutch 124. The first planetary gear assembly 154 further comprises at least two planet pinions 162 each of which is in mesh with the sun and ring gears 158 and 160 and which is rotatable about an axis around the common axis of rotation of the sun and ring gears 158 and 160. The planet pinions 162 of the first planetary gear assembly 154 are jointly connected to a pinion carrier 164. The second planetary gear assembly 156 is constructed similarly to the first planetary gear assembly 154 and thus comprises an externally toothed sun gear 166 and an internally toothed ring gear 168 which have a common axis of rotation aligned with the center axis of the transmission hollow input shaft 110. The sun gear 166 is formed integral with the sun gear 158 of the first planetary gear assembly 154. The sun gears 158 and 166 of the first and second planetary gear assemblies 154 and 156, respectively, are jointly splined to a connecting shell 170 which encloses the forward drive clutch 124 and the first planetary gear assembly 154 and is securely connected to the first clutch drum 132 for the high-and-reverse clutch 122. The second planetary gear assembly 156 further comprises at least two planet pinions 172 each of which is in mesh with the sun and ring gears 166 and 168 and which is rotatable about an axis around the common axis of rotation of the sun and ring gears 166 and 168. The planet pinions 172 of the second planetary gear assembly 156 are jointly connected to a pinion carrier 174 having a drum portion 176 which leftwardly extends to enclose in part the connecting shell 170 therein, as shown. For the reason which will become clear later, the drum portion 176 of the pinion carrier 174 has a circular step portion 178. The respective sun gears 158 and 166 of the first and second planetary gear assemblies 154 and 156 are formed with center bores through which a transmission hollow output shaft 180 having a center axis aligned with the center axis of the input shaft 110 is passed and axially extends toward the torque converter assembly 10. The output shaft 180 thus coaxially receives therein the input shaft 110, as shown. The output shaft 180 has a left end to which the pinion carrier 164 for the first planetary gear assembly 154 is splined at its inner peripheral edge and has an intermediate portion to which the ring gear 168 for the second planetary gear assembly 156 is connected through a generally disc shaped connecting member 182 which is keyed or splined at its inner peripheral edge to the intermediate portion of the output shaft 180 and at its output peipheral edge to the ring gear 168. Concentrically mounted around the drum portion 176 of the pinion carrier 174 for the second planetary gear assembly 156 is a low-and-reverse brake 184. This brake 184 comprises a plurality of plates 186 keyed or splined at their inner peripheral edges to the drum portion 176 for the second planetary gear assembly 156, and a plurality of plates 188 which are keyed or splined at their outer peripheral edges to an intermediate portion of the inner wall of the gear unit housing 28. The low-and-reverse brake 184 further has a drum shaped piston 190 which is concentrically mounted around the first clutch drum 132 for the high-and-reverse clutch 122 and engages at its right end to the leftmost member of the plates 186 and 188. The left end portion of the piston 190 is sealingly disposed in a fluid chamber 192 into which a fluid under pressure is fed to move the piston 190 rightwardly urging the plates 186 and 188 of the brake unit 184 to be engaged with one another against a biasing force developed by a return spring 194 which is interposed between the left end portion of the piston 190 and a spring retainer 196 fixed to the gear unit housing 28 via bolts 198. As shown, the fluid chamber 192 is formed at the leftmost portion of the gear unit 12, more specifically at the portion just around the oil pump assembly 120. The low-and-reverse brake 184 is paralleled in effect by a transmission one-way clutch 200 which is positioned around the before-mentioned drum portion 176 for the second planetary gear assembly 156 and comprises a stationary outer race member 202, a rotatable inner race member 204 and a series of spring loaded rollers 206 disposed between the outer and inner race members 202 and 204. The stationary outer race member 202 is splined to the inner wall of the gear unit housing 28. On the other hand, the rotatable inner race member 204 is securely disposed on the before-mentioned circular step portion 178 of the drum portion 176 for the second planetary gear assembly 156. The rollers 206 are arranged in a manner to be caused to stick to the outer and inner race members 202 and 204 and thereby lock up the rotatable inner race member 204 to the stationary outer race member 202 when the inner race member 204 is urged to turn about the center axis of the output shaft 180 in a direction opposite to the direction of rotation of the engine crankshaft 106, viz, to the direction of rotation of the output shaft 180 to produce a forward drive mode of an automotive vehicle. The gear unit 12 of the transmission 36 further comprises a brake band 208 which wrappes the cylindrical outer surface of the first clutch drum 132 for the high-and-reverse clutch 122. Although not shown, the brake band 208 is anchored at one end to the gear unit housing 28 and is at the other end connected to or engaged by a conventional fluid operated band servo unit (not shown). Although, not shown in the drawing, a conventional transmission governor assembly connected to the transmission hollow output shaft 180 is mounted in the gear unit housing 28 in the vicinity of the ring gear 168 of the second planetary gear assembly 156 in such a manner that primary and secondary governor valves thereof are arranged in diametrically opposed relationship to each other across the center axis of the output shaft 180. The housing of the before-mentioned oil pump assembly 120 has a rightwardly extending sleeve shaft portion 210 in which a fluid passage 212 for lubrication fluid for the clutch assemblies 122 and 124 is formed. Indicated by numeral 214 is a parking gear which is secured on the ring gear 168 for the second planetary gear assembly 156, forming part of a parking lock assembly to lock the output shaft 180 by the aid of a parking pawl (not shown) meshing with the parking gear 214 during parking of the vehicle. Indicated generally by numeral 216 is a hydraulic control valve unit by which the gear unit 12 is controlled.

TABLE 1

| Range | | Clutches High-and-reverse (122) | Forward drive (124) | Low & reverse brake (184) | One way clutch (200) | Brake band (208) Applied | Brake band (208) Released |
|---|---|---|---|---|---|---|---|
| "P" | | | | 0 | | | |
| "R" | | 0 | | 0 | | | 0 |
| "N" | | | | | | | |
| Drive | "D$_1$" | | 0 | | 0 | | |
| | "D$_2$" | | 0 | | | 0 | |
| | "D$_3$" | 0 | 0 | | | (0) | 0 |
| "2" | | | 0 | | | 0 | |
| "1" | 2 | | 0 | | | 0 | |
| | 1 | | 0 | 0 | | | |

The high-and-reverse and forward drive clutches 122 and 124, the low-and-reverse brake 184, one-way clutch 200 and brake band 208 of the transmission mechanism or the gear unit 12 having the construction hereinbefore described are operated in accordance with schedules indicated in Table 1.

In Table 1, the sign "O" indicates that for each of the high-and-reverse, forward-drive and one-way clutches 122, 124 and 200 the clutch in question is in a coupled condition and for the low-and-reverse brake 184 the brake is in a condition applied. As to the brake band 208, the sign "O" in the column under "Applied" indicates that the brake band 208 is actuated to lock up the first clutch drum 132 and the sign "0" in the column under "Released" indicates that the brake band 208 is released from the first clutch drum 132. The sign "O" enclosed in the parentheses means that there is a fluid pressure developed in the brake-apply chamber of the servo unit (not shown) but the brake band 208 is released from the first clutch drum 132 with a fluid pressure also developed in the brake-release chamber of the servo unit.

The parking, reverse drive and neutral gear ranges and the automatic forward drive and manual second and first forward drive ranges as indicated in the leftmost column of Table are selectively established in the transmission mechanism by manipulating a manual selector lever (not shown) which has positions "P", "R", "N", "D", "2" and "1" respectively corresponding to the above-mentioned gear ranges.

When now the selector lever is in the parking range "P" or the neutral range "N", both of the high-and-reverse and forward drive clutches 122 and 124 are held in the uncoupled condition thereof so that the driving connection between the input and output shafts 110 and 180 is interrupted and as a consequence the output shaft 180 is maintained at rest even though the engine is in operation delivering its power output from the crankshaft 106. Under these conditions, either the parking range or the neutral range is established in the transmission mechanism depending upon whether the transmission gear shift lever is held in the parking range "P" or in the neutral range "N". If the selector lever is in the parking range "P", the low-and-reverse brake 184 is held in the condition applied so that the drum portion 176 and accordingly, the pinion carrier 174 of the second planetary gear assembly 156 are locked to the gear unit housing 28. During parking of the vehicle, the parking gear 214 mounted on the ring gear 168 for the second planetary gear assembly 156 is captured by the parking pawl (not shown) of the beforementioned parking lock assembly so that the output shaft 180 is locked up to the gear unit housing 28.

When the manual lever is moved into the automatic forward drive range "D" with the engine operating, the forward drive clutch 124 is caused to couple. The power output delivered from the crankshaft 106 of the engine to the input shaft 110 through the torque converter assembly 10 is transmittted through the forward drive clutch 124 and the clutch hub 136 to the ring gear 160 of the first planetary gear assembly 154. The ring gear 160 is driven to rotate in the forward direction about the center axis of the output shaft 188 and thereby causes the sun gear 158 to rotate in the opposite direction about the center axis of the output shaft 180 through the planet pinions 162 each of which is rotated in the same direction as the ring gear 160 about its own axis of rotation. The sun gear 166 of the second planetary gear assembly 156, which is integral with the sun gear 158 of the first planetary gear assembly 154, is rotated in the opposite or reverse direction about the center axis of the output shaft 180 and causes the ring gear 168 of the second planetary gear assembly 156 to turn in the forward direction about the center axis of the output shaft 180. Under these conditions, the individual planet pinions 172 of the second planetary gear assembly 156 are caused to rotate in the forward direction about the respective axes of rotation thereof and therefore attempt to turn in the reverse direction about the center axis of the output shaft 180. The revolution of the pinion carrier 174 of the second planetary gear assembly 156 is, however, prohibited by the one-way clutch 200 connected to the pinion carrier 174, more specifically to the step portion 178 of the drum portion 176 with the result that the pinion carrier 174 is locked to the gear unit housing 28 and acts as reaction elements for the ring gear 168 which drives via the disc-shaped connecting member 182 the output shaft 180 to rotate in the forward direction about the center axis thereof. The output shaft 180 is connected to the pinion carrier 164 of the first planetary gear assembly 154 so that each of the planet pinions 162 is rotated about the center axis of the transmission hollow output shaft 180 in the same direction as the direction of rotation of the ring gear 160 of the first planetary gear assembly 154 but at a revolution speed which is lower with a certain ratio than the revolution speed of the ring gear 160 on which the planet pinions 162 are rolling, thereby creating the first forward speed or "low" gear ratio ($D_1$) in the transmission mechanism.

If the vehicle is thereafter sped up and the vehicle speed reaches a certain level, the band servo unit for the brake band 208 is actuated by a fluid distributed into the brake-apply fluid chamber of the servo unit and causes the brake band 208 to be tightened around the first clutch drum 132 which is connected via the connecting shell 170 to the integral first and second sun gears 158 and 166 for the first and second planetary gear assemblies 154 and 156. The sun gear 158 of the first planetary gear assembly 154 now acts as a reaction element for the planet pinions 162 which are being driven to turn in the forward direction about the center axis of the output shaft 180 by the ring gear 160 rotating with the input shaft 110 through the forward drive clutch 124 which is kept coupled. The driving torque carried over to the ring gear 160 of the first planetary gear assembly 154 through the forward drive clutch 124 is therefore transmitted to the output shaft 180 by means of the planet pinions 162 and the associated pinion carrier 164. Under these conditions, the individual planet pinions 162 of the first planetary gear assembly 154 are caused to rotate in the forward direction about the respective axes of rotation thereof and thus roll on the ring gear 160 while rotating in the forward direction about the center axis of the output shaft 180. The output shaft 180 is thus rotated in the forward direction about the center axis thereof at a speed higher than that achieved under the first forward speed of "low" gear ratio ($D_1$) but lower with a certain ratio than the revolution speed of the ring gear 160 of the first planetary gear assembly 154, thereby producing the second forward speed or intermediate ratio ($D_2$) in the transmission mechanism. Under the second forward speed thus established, the output shaft 180 drives the ring gear 168 of the second planetary gear assembly 156 to rotate in the forward direction about the center axis of the output shaft 180 and thereby causes the planet pinions 172 to turn about the center axis of the output shaft 180 in the same direction as the direction of rotation of the ring 168. Thus, the pinion carrier 174 of the second planetary gear assembly 156 and accordingly the drum portion 176 are also rotated in the forward direction about the center axis of the output shaft 180 and cause the inner race member 204 of the transmission one-way clutch 200 to run idle within the outer race member 202 of the one-way clutch 200.

As the vehicle speed further increases, a fluid is distributed into the brake-release fluid chamber of the band servo unit for the brake band 208 and causes the brake band 208 to be released from the first clutch drum 132 and, substantially at the same time, the high-and-reverse clutch 122 is actuated to couple. The power output delivered from the crankshaft 106 of the engine to the input shaft 110 is now transmitted on one hand to the integral first and second gears 158 and 166 of the first and second planetary gear assemblies 154 and 156 through the high-and-reverse clutch 122 and the first clutch drum 132 released from the brake band 208 and on the other hand to the ring gear 160 of the first planetary gear assembly 154 by way of the forward drive clutch 124 and the clutch hub 136. It therefore follows that the sun gear 158 and the ring gear 160 for the first planetary gear assembly 154 are locked together so that the sun and ring gears 158 and 160 and the planet pinions 162 therebetween as well as the output shaft 180 connected to the planet pinion 162 by the pinion carrier 164 are driven to rotate as a single unit in the forward direction about the center axis of the output shaft 180. The output shaft is thus rotated in the forward direction about the center axis thereof at a speed substantially equal to the revolution speed of the input shaft 110, thereby providing the third forward speed or "high" gear ratio ($D_3$) in the transmission mechanism. Under the third forward drive speed thus established, the input shaft 110 driven by the turbine runner 102 of the torque converter 10 is rotated at a speed substantially equal to the revolution speed of the engine crankshaft 106 driving the pump impeller 100 of the converter 10 and, as a consequence, there occurs no torque multiplication by the torque converter 10, which thus functions merely as a fluid coupling.

When the manual selector lever is moved into the reverse drive range "R". The high-and-reverse clutch 122 and the low-and-reverse brake 184 are actuated in the transmission mechanism. With the high-and-reverse clutch 122 thus coupled, the power output delivered from the crankshaft 106 of the engine to the input shaft 110 by way of the torque converter 10 is transmitted through the high-and-reverse clutch 122, first clutch drum 132 and connecting shell 170 to the sun gears 158 and 166 of the first and second planetary gear assemblies 154 and 156, respectively, causing the sun gears 158 and 166 to rotate in the forward direction about the center axis of the output shaft 180. The low-and reverse brake 184 is being actuated to lock the drum portion 176 and thus the pinion carrier 174 for the second planetary gear assembly 156 is held stationary with respect to the gear unit housing 28, with the result that the planet pinions 172 of the second planetary gear assembly 156 are driven by the sun gear 166 for rotation in the reverse direction about the center axis of the output shaft 180. This causes the output shaft 180 to rotate in the reverse direction about the center axis thereof at a speed which is lower with a certain ratio than the revolution speed of the sun gears 158 and 166 of the first and second planetary gear assemblies 154 and 156 and accordingly of the input shaft 110, establishing the reverse drive range "R" in the transmission mechanism.

When the selector lever is in the manual second forward drive range "2", the forward drive clutch 124 and the brake band 208 are actuated and, as a consequence the output shaft 180 is driven to rotate in the forward direction about the center axis thereof by means of the pinion carrier 164 of the first planetary gear assembly 154 as in the second forward drive ($D_2$) produced with the selector lever held in the automatic forward drive range "D".

Figure 5:
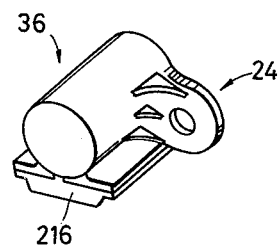
FIG. 5 is a sketch for showing the positional relationship between the transmission and the final drive unit.

Under the condition in which the selector lever is held in the manual first forward drive range position "1", either the low-and-reverse brake 184 or the brake band 208 as well as the forward drive clutch 124 is actuated to lock the pinion carrier 174 of the second planetary gear assembly 156 or the respective sun gears 158 and 166 of the first and second planetary gear assemblies 154 and 156 depending upon the vehicle speed. If the forward drive clutch 124 and the brake band 208 are actuated in this instance, the output shaft 180 is driven to rotate in the forward direction by the pinion carrier 164 of the first planetary gear assembly 154 as in the second forward speed gear condition established with the selector lever held in the automatic forward drive range "D". If, on the other hand, the forward drive clutch 124 and the low-and-reverse brake 184 are actuated in the manual forward speed range, the output shaft 180 is driven to rotate in the forward direction about the center axis thereof by the ring gear 168 of the secondary planetary gear assembly 156 having the pinion carrier 174 hed stationary with respect to the gear unit housing 28, as in the first forward speed gear produced with the selector lever held in the automatic forward drive range "D". While the pinion carrier 174 is locked to the gear unit housing 28 by the action of the transmission one-way clutch 200 under the first forward speed produced in the automatic forward drive range, the pinion carrier 174 is locked to the gear unit housing 28 by means of the low-and-reverse brake 184 under the first forward speed produced in the manual first forward drive range. During the first forward speed in the manual first forward drive range, therefore a driving torque can be transmitted backwardly from the ring gear 168 to the sun gear 166 through the planet pinions 172 in the second planetary gear assembly 156 and, for this reason, the engine brake can be obtained The final drive unit 24 is positioned on a lateral side of the transmission 36 as is seen from FIG. 5 and comprises a housing 38 of the unit 24, which is integral with the converter housing 26 and encloses therein a differential case 234, a differential pinion shaft 236 passing through the case 234, differential pinions 238 rotatably disposed about the pinion shaft 236, and differential side gears 240 each meshing with both the differential pinions 238 as is known in the art. The case 234 has both lateral end portions on which differential side bearings 242a and 242b are mounted. The right hand bearing 242a is securely received in the bore of the housing 38, while the left-hand bearing 242b is received in a drum-shaped retainer 244 which is detachably held in an opening (no numeral) formed in a laterally projected portion 28a of the gear unit housing 28. Denoted by numeral 246 is a bolt for connecting the retainer 244 to the gear unit housing 28. Extending away from the differential side gears 240 are respective axle shafts 248a and 248b. The case 234 is integrally formed with a connecting shell portion 250 which extends leftwardly in this drawing and spacedly encloses in part the drum-shaped retainer 244. The connecting shell portion 250 has at the leading end thereof a flange 256 to which the externally toothed ring gear 22 is fixed by means of bolts 254. Although not well shown in FIG. 4, the ring gear 22 meshes with a later-mentioned the idler gear 18 for making up the power train between the internal combustion engine and the driving road wheels of the vehicle.

The following description is directed to important portions of the unit of the transmission 36 and the differential gear assembly 24, to which the present invention is directly applied.

The output gear 14 is integrally formed on the right section of the transmission hollow output shaft 180 so as to have a common axis of rotation aligned with the center axis of the output shaft 180. As will be understood from the drawing, the output gear 14 is situated within a chamber 218 which is defined by not only an extension 42 (which is referred to as the supporting portion in FIG. 3) of the base wall 26a of the converter housing 26 but also the flange portion 40 (which is referred to as the separate cover member in FIG. 3) of the stator support hollow shaft 112. Bolts 220 are used for detachably connecting the flange portion 40 to the extension 42. The extension 42 has at its leftward end a bearing opening 222 within which is situated the bearing 16b, that is a tapered roller bearing in the illustrated embodiment. The flange portion 40 of the stator support hollow shaft 112 has at its leftward portion a bearing opening or bore 224 within which is situated the tapered roller bearing 16a. The inner races (no numerals) of these bearings 16a and 16b support the transmission hollow output shaft 180 in such an arrangement that the output gear 14 is sandwiched between the bearings 16a and 16b. Meshing with the output gear 14 is the idler gear 18 which is supported by the pair of bearings 20a and 20b which are tapered roller bearings in this embodiment. The inner races of these bearings 20a and 20b are concentrically mounted on a sleeve shaft 43 (which is referred to as support member in FIG. 3) which is connected to the flange portion 40 of the stator support hollow shaft 112 by means of a bolt 228 passing through the sleeve shaft 43, so that the axis of the idler gear 18 is parallel with the axis of the output gear 14. As shown, the rightward end of the sleeve shaft 43 is snugly received in a blind bore 230 formed in the flange portion 40 of the stator support hollow shaft 112 and the left enlarged head portion of the same is disposed in an opening 232 formed in the extension 42 of the base wall 26a of the converter housing 26. The idler gear 18 is meshed weth the before-mentioned externally toothed ring gear 22 forming part of the final drive unit 24.

With the above-mentioned construction of the invention, the following advantages are achieved.

Since the support member 42 for the bearing 16b is integral with the converter housing 26, it possesses great rigidity. The rigidity is increased by the ribs 44 integrally formed on the support member 42.

Since the cover member 40 by which the bearing 16a is supported is constructed to have an axially extending portion such as the stator support hollow shaft 112, sufficient rigidity and high mechanical strength of the cover member 40 is obtained.

What is claimed is:

1. A power transmission including a torque converter housed in a converter housing, a planetary gear system that includes planetary gear elements, a power input shaft of said planetary gear system being connected to a driven member of said torque converter, a power output shaft of said planetary gear system having an output gear disposed between said torque converter and said gear elements, first and second bearing members arranged on either side of said output gear to rotatably support the same, an idler gear meshing with said output gear for providing drive connection between said output gear and a final drive unit, third and fourth bearing members for rotatably supporting said idler gear, and a gear unit housing enclosing said planetary gear system, said power transmission comprising:

a first support member integral in a one piece unitary manner with and defined in a portion of said converter housing, said first support member being located between said gear elements and said output gear and having an opening in which said first bearing member is disposed for rotatably supporting in part said output gear relative to said first support member and a second opening through which said idler gear projects to mesh with said output gear;

a second support member detachably disposed within and connected to the interior of said converter housing and having a bore in which said second bearing member is disposed for rotatably supporting in part said output gear relative to said second support member; and a third support member consisting of a shaft extending between and detachably fixed to said first and second support members, said third support member mounting thereon said third and fourth bearing members on which said idler gear is rotatably supported.

2. A power transmission as claimed in claim 1, in which said first support member protrudes toward said planetary gear elements from a base portion of said converter housing, said base portion forming a partition between chambers respectively formed by said torque converter and gear unit housings.

3. A power transmission as claimed in claim 1, in which said second support member is integral with a shaft on which a stator of said torque converter is journalled.

4. A power transmission as claimed in claim 1, in which said third support member comprises a hollow shaft having one end snugly held in an opening formed in said first support member and the other end snugly disposed in a blind bore formed in said second support member.

5. A power transmission as claimed in claim 4, in which said third support member further comprises a bolt which axially passes through said hollow shaft to secure the same to said second support member.

6. A power transmission comprising:

a single piece torque converter and final drive unit housing unit comprising integral torque converter housing and final drive unit housing respectively housing a torque converter and a final drive unit;

a single piece planetary gear unit housing unit having integral planetary gear unit housing, disposable with said torque converter housing, and cover for closing said final drive unit housing;

a planetary gear unit disposed in said planetary gear unit housing, said planetary gear unit having an input shaft connected to a driven member of said torque converter and an output shaft;

an output gear fixedly carried on said output shaft and disposed within said torque converter housing between said planetary gear unit and said torque converter;

a first support member disposed within said torque converter housing and detachably connected to the interior of same, said first support member being disposed between said torque converter and said output gear and having a stepped through bore through which said input shaft passes;

a first bearing for supporting said output gear disposed in an annular recess defined within said torque converter housing;

a second bearing for supporting said output gear disposed in said stepped through bore;

a cylindrical support member extending between and detachably fixed to both said torque converter housing and said first support member;

third and fourth bearings disposed on said cylindrical support member; and an idler gear journalled on said third and fourth bearings which projects through a second aperture formed in said torque converter housing to mesh with said output gear and provide a drive connection between said output gear and said final drive unit.

7. A power transmission as claimed in claim 6, in which said torque converter and final drive unit housing unit takes the form of first and second integral bell housing respectively housing said torque converter unit and said final drive unit, in which said planetary gear unit housing unit takes the form of a third bell housing with said cover, said third bell housing receiving therein said planetary gear unit and enclosing part of the head of said first bell housing when said planetary gear unit housing unit is fastened to said torque converter and final drive unit housing unit, and in which said cover extends away from said third bell housing substantially at the level of the mouth of said third bell housing.

8. A power transmission as claimed in claim 6, wherein said first support member includes an integral shaft which extends coaxially about said stepped bore and which supports at least the stator of said torque converter.

9. A power transmission as claimed in claim 6, wherein said cylindrical support member takes the form of a hollow sleeve having one end supported by said torque converter housing and the other end supported by said first support member, said hollow sleeve having a bolt disposed therethrough which threadedly engages a threaded bore formed in said first support member.

10. In a vehicle having an engine,
a power transmission including
a hydrokinetic unit driven by said engine,
a planetary gear unit connected to said hydrokinetic unit through an input shaft,
a final drive unit connected to said planetary gear unit through an idler gear meshing with an output gear carried on an output shaft of said planetary gear unit,
a first housing unit having integral first and second inversely oriented bell portions, said first bell portion housing said hydrokinetic unit and said second bell portion housing said final drive unit,
a second housing unit having an integral third bell portion for housing said planetary gear unit, and cover member for closing said second bell portion,
a support member for supporting said hydrokinetic unit within said first bell portion, said support member being disposed within and detachably mounted to said first bell portion so as to define a chamber within said first bell portion inboard of said torque converter for housing said output gear, said support member also being formed with a stepped through bore through which said input shaft is disposed, a first bearing for supporting said output gear, said first bearing being disposed in an annular recess which is formed in the interior of said first bell portion and within said chamber, means forming part of said stepped through bore and defining an aperture smaller in diameter than said first bearing, which is coaxial with said first bearing and through which said input and output shafts extend to said planetary gear unit, a second bearing for supporting said output gear disposed in said stepped through bore, a cylindrical support member detachably connected at one end to said first bell portion and which extends thereinto and is detachably connected at the other end to said support member, third and fourth bearings disposed on said cylindrical support member for rotatably supporting said idler gear in a manner that said idler gear projects through a second aperture formed in said first bell portion to mesh with said output gear.

11. A vehicle transmission as claimed in claim 10, wherein said cylindrical support member is a hollow sleeve connected to said support member by a bolt disposed therethrough.

12. A vehicle transmission as claimed in claim 11, wherein said sleeve has a shoulder at the end supported by said first bell portion which serves to retain said third and fourth bearings thereon and out of contact with said first bell portion.

13. A vehicle transmission as claimed in claim 10, wherein said hydrokinetic unit is a torque converter.

14. A vehicle transmission as claimed in claim 10, wherein said cover member extends from said third bell portion substantially at the level of the mouth of said third bell portion and which is reinforced by at least one web interconnecting said cover member and said third bell portion.

15. In a vehicle transmission having a hydrokinetic unit, a planetary gear unit connected to said hydrokinetic unit through an input shaft and a final drive unit connected to said planetary gear unit through an idler gear which meshes with an output gear carried on an output shaft of said planetary gear unit, a first housing unit formed with integral first and second inversely oriented bell portions, said first and second bell portions each having a mouth and a head and being free of undercut portions between the mouths and heads thereof, the respective longitudinal axes of said first and second bell portions being substantially parallel, said first bell portion receiving said hydrokinetic unit therein and said second bell portion receiving said final drive unit therein, a second housing unit formed with integral third bell portion and cover member, said third bell portion receiving therein said planetary gear unit, said second housing unit being connectable to said first housing unit with the mouth of said third bell portion enclosing part of the head of said first bell portion, with the longitudinal axis of said third bell portion substantially aligned with the longitudinal axis of said first bell portion and with said cover member closing the mouth of said second bell portion;

a first single piece support member for supporting said hydrokinetic unit which is so constructed and arranged as to be detachably connected to the interior of said first bell portion to close off a portion of same to define a chamber in the head of said first bell portion which is inboard of said hydrokinetic unit, said chamber housing said output gear, said first support member being formed with a through bore through which said input shaft is disposed;

a first bearing disposed in an annular recess defined about a first aperture formed in the head of said first bell portion through which said input and output shafts extend, said annular recess being arranged so that said first bearing can be placed thereinto only through the mouth of said first bell portion;

a second bearing disposed in the mouth of said through bore which is exposed to said chamber; said first and second bearings supporting said output gear within said chamber;

a hollow detachably fixed sleeve supported at a first end in an opening formed in said first bell portion and which extends to and engages said support member at the second end thereof, said sleeve having a shoulder formed at said first end and a fastening bolt disposed therethrough which threadedly engages said support member; and third and fourth bearings disposed on said sleeve between said shoulder and said support member for rotatably supporting said idler gear which projects through a second aperture formed in said first bell portion to mesh with said output gear.

16. A vehicle transmission as claimed in claim 15, wherein said first bell portion is formed internally with at least one web for increasing the rigidity thereof.

* * * * *